(12) United States Patent
Cook et al.

(10) Patent No.: US 7,589,896 B2
(45) Date of Patent: Sep. 15, 2009

(54) OPTICAL PULSE-WIDTH MODIFIER STRUCTURE

(75) Inventors: Lacy G. Cook, El Segundo, CA (US); Joshua J. Thornes, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 365 days.

(21) Appl. No.: 11/789,935

(22) Filed: Apr. 26, 2007

(65) Prior Publication Data

US 2008/0266663 A1 Oct. 30, 2008

(51) Int. Cl.
*G02B 5/18* (2006.01)
(52) U.S. Cl. .................. 359/572; 359/566; 359/576
(58) Field of Classification Search ............. 359/566, 359/572, 576
See application file for complete search history.

(56) References Cited

U.S. PATENT DOCUMENTS

| | | | |
|---|---|---|---|
| 3,943,457 | A | 3/1976 | Lehmberg |
| 4,588,957 | A | 5/1986 | Balant et al. |
| 4,612,641 | A | 9/1986 | Corkum |
| 4,750,809 | A | 6/1988 | Kafka et al. |
| 5,907,436 | A | 5/1999 | Perry et al. |
| 6,795,199 | B2 | 9/2004 | Suhami |
| 2003/0189756 | A1 | 10/2003 | Erbert et al. |
| 2006/0033923 | A1 | 2/2006 | Hirasawa et al. |

FOREIGN PATENT DOCUMENTS

DE 197 44 302 A1 4/1999

WO WO 03/055015 A 7/2003

OTHER PUBLICATIONS

Cheriaux G et al, Abberation-Free Stretcher Design for Ultrashort-Pulse Amplification, Optics Ltrs, Optical Soc of Amer, Mar. 15, 1996, pp. 414-416, vol. 21, No. 6, Wash DC, USA.
Walmsley Ian et al, The Role of Dispersion in Ultrafast Optics, Review of Scientific Instruments, AIP, Jan. 1, 2001, pp. 1-29, vol. 72, No. 1, Melville, NY, USA.
Edmond B. Treacy, "Optical Pulse Compression With Diffraction Gratings", IEEE Journal of Quantum Electronics, vol. QE-5, No. 9, Sep. 1969, pp. 454-458.
Oscar Eduardo Martinez, "3000 Times Grating Compressor with Positive Group Velocity Dispersion: Application to Fiber Compensation in 1.3-1.6 μm Region", IEEE Journal of Quantum Electronics, vol. QE-23, No. 1, Jan. 1987, pp. 59-64.
G. Cheriaux et al., "Aberration-free stretcher design for ultrashort-pulse amplification," Optics Letters, vol. 21, No. 6, Mar. 15, 1996, pp. 414-416.

*Primary Examiner*—Joshua L Pritchett
(74) *Attorney, Agent, or Firm*—Leonard A. Alkov

(57) ABSTRACT

An optical pulse-width modifier structure includes a first diffraction grating and an optically unpowered reversing mirror. An optical path extends between the first diffraction grating and the optically unpowered reversing mirror. A second diffraction grating lies on the optical path between the first diffraction grating and the optically unpowered mirror. A set of optically powered mirrors lies on the optical path between the first diffraction grating and the second diffraction grating. The diffraction gratings and mirrors are positioned such that an input light beam is diffracted from the first diffraction grating, reflected from each of the set of optically powered mirrors, diffracted from the second diffraction grating, reflected from the optically unpowered reversing mirror back to the second diffraction grating, diffracted from the second diffraction grating, reflected from each of the set of optically powered mirrors, and diffracted from the first diffraction grating as an output light beam. The present approach produces a differential path length as a function of wavelength.

17 Claims, 5 Drawing Sheets

| SURF | DESCRIPTION | RD | CC | AD | AE | AF | AG |
|---|---|---|---|---|---|---|---|
| 1 | PUPIL | INFIN | — | — | — | — | — |
| 2 | PRIMARY | -8.2141 | -0.960998 | 1.44457E-05 | -7.5112E-09 | -9.9300E-09 | 1.6446E-10 |
| 3 | SECONDARY | -7.5473 | -56.288 | -1.4856E-03 | 6.7273E-04 | -1.3830E-04 | 5.5780E-06 |
| 4 | IMAGE | INFIN | — | — | — | — | — |
| 5 | TERTIARY | 7.5473 | -56.288 | 1.4856E-03 | -6.7273E-04 | 1.3830E-04 | -5.5780E-06 |
| 6 | QUATERNARY | 8.2141 | -0.960998 | -1.44457E-05 | 7.5112E-09 | 9.9300E-09 | -1.6446E-10 |
| 7 | PUPIL | INFIN | — | — | — | — | — |

PUPIL DIAMETERS ARE 1.00Y BY 2.00X
TOTAL FOV IS 10 DEGS

FIG. 8A

| SURF | AH | AI | THICKNESS | TYPE | Y DECENTER |
|---|---|---|---|---|---|
| 1 | — | — | 9.8638 | AIR | 3.000 |
| 2 | 2.5554E-11 | -6.8926E-13 | -3.1215 | REFL | — |
| 3 | 3.1518E-06 | -4.4095E-07 | 1.3340 | REFL | — |
| 4 | — | — | 1.3340 | AIR | — |
| 5 | -3.1518E-06 | 4.4095E-07 | -3.1215 | REFL | — |
| 6 | -2.5554E-11 | 6.8926E-13 | 9.8639 | REFL | — |
| 7 | — | — | — | AIR | -3.000 |

FIG. 8B

OPTICAL PULSE-WIDTH MODIFIER STRUCTURE

This invention relates to a device that temporally broadens or compresses short-duration light pulses and, more particularly, to a two-pass pulse-width modifier structure with intermediate powered mirrors positioned between diffraction gratings.

BACKGROUND OF THE INVENTION

Very short-duration, high-power laser pulses are needed for some applications. Such pulses may have a duration in the tens of femtoseconds. However, it may be risky to attempt to amplify such short-duration pulses, because the gain medium may be damaged due to the high peak field and energy densities of the short-duration pulse.

One strategy to amplify short-duration optical pulses is to broaden (i.e., expand) the pulse to a longer duration, for example in the picosecond range. The amplification is performed on the longer-duration pulse, which has a lower energy density than the shorter-duration pulse. Because of the lower energy density of the longer-duration pulse, there is less likelihood of damage to the gain medium of the amplifier. The amplified pulse is then compressed back to the required shorter duration, for example in the tens of femtoseconds range.

The implementation of this amplification strategy requires optical transformations of the light pulse using appropriate hardware. A limiting factor on this amplification strategy is aberrations of various types introduced into the light pulse by the pulse broadening and pulse compression hardware. The aberrations have the net effect of lengthening the minimum pulse duration or, stated alternatively, of placing a limit on the minimum duration of the amplified light pulse. That is, the temporally broadened, amplified, and then temporally compressed light pulse is necessarily longer in time than the original unamplified light pulse.

There is a need for an improved approach to broadening and/or compressing short-duration light pulses, which avoids the limitations placed on the temporal compression by aberration effects. The present invention fulfills this need, and further provides related advantages.

SUMMARY OF THE INVENTION

The present approach provides an optical pulse-width modifier structure that minimizes or eliminates common aberrations that otherwise limit the ability to compress light pulses. The input and output light beams may be spatially separated, so that it is easy to access the output light beam separately from the input light beam. The structure is continuously adjustable to vary the amount of temporal broadening or compression of the light pulse, so that a wide range of continuously variable broadening and compression values may be selected. The apparatus is also more compact than alternative approaches.

In accordance with the invention, an optical pulse-width modifier structure comprises a first diffraction grating and an optically unpowered reversing mirror. An optical path extends between the first diffraction grating and the optically unpowered reversing mirror. The optical pulse-width modifier structure further includes a second diffraction grating lying on the optical path between the first diffraction grating and the optically unpowered reversing mirror, and a set of optically powered mirrors lying on the optical path between the first diffraction grating and the second diffraction grating. The diffraction gratings and mirrors are positioned such that an input light beam is diffracted from the first diffraction grating, reflected from each of the set of optically powered mirrors, diffracted from the second diffraction grating, reflected from the optically unpowered reversing mirror back to the second diffraction grating, diffracted from the second diffraction grating, reflected from each of the set of optically powered mirrors, and diffracted from the first diffraction grating as an output light beam.

In the preferred approach, the set of optically powered mirrors has a first pupil at the first diffraction grating and a second pupil at the second diffraction grating. The set of optically powered mirrors comprises four optically powered mirrors, most preferably having optical powers in order of positive, negative, negative, and positive.

Preferably, the optically unpowered reversing mirror is a roof mirror or its equivalent. This provides one approach whereby the input light beam is spatially separated from the output light beam.

There is optionally an optically unpowered fold mirror positioned to reflect the input light beam to the first diffraction grating, and the output light beam received from the first diffraction grating.

Desirably, the optical pulse-width modifier structure further includes a positional translator drive having a first support upon which the first diffraction grating (and the optically unpowered fold mirror, where provided) is mounted, and a second support upon which the second diffraction grating and the optically unpowered reversing mirror are mounted. The first support and the second support move toward or away from the set of optically powered mirrors in a coordinated fashion. This movement alters the optical path length difference for light of different wavelengths. For example, there may be no optical path length difference for light of different wavelengths along the optical path between the first diffraction grating and the second diffraction grating. There may instead be an optical path length difference for light of different wavelengths along the optical path between the first diffraction grating and the second diffraction grating.

In a particularly preferred embodiment, an optical pulse-width modifier structure comprises a first diffraction grating, and an optically unpowered reversing roof mirror. An optical path extends between the first diffraction grating and the optically unpowered reversing roof mirror. A second diffraction grating lies on the optical path between the first diffraction grating and the optically unpowered reversing roof mirror. A set of four optically powered mirrors lies on the optical path between the first diffraction grating and the second diffraction grating. The set of optically powered mirrors has a first pupil at the first diffraction grating and a second pupil at the second diffraction grating. The diffraction gratings and mirrors are positioned such that an input light beam is diffracted from the first diffraction grating, reflected from each of the set of optically powered mirrors, diffracted from the second diffraction grating, reflected from the optically unpowered reversing roof mirror back to the second diffraction grating, diffracted from the second diffraction grating, reflected from each of the set of optically powered mirrors, and diffracted from the first diffraction grating as an output light beam. With this approach, the input light beam is spatially separated from the output light beam. Other compatible features discussed herein may be used with this embodiment.

The present apparatus may be used either to broaden a short pulse or to compress a long pulse. Pulse broadening is accomplished in either of two ways: first, by adding relatively more optical path to the short wavelength of the pulse, creating a pulse where long wavelength leads the pulse; or, second, by adding relatively more optical path length to the long wavelength of the pulse, creating a pulse where the short wavelength leads the pulse. Pulse compression is performed either, where the short wavelength leads the pulse, by adding relatively more optical path length to the short wavelength; or, where the long wavelength leads the pulse, by adding relatively more optical path length to the long wavelength.

The present approach permits continuously adjustable optical pulse-width modification while minimizing or eliminating the aberrations that otherwise limit the ability to compress light pulses. With the preferred embodiment using the optically unpowered reversing roof mirror or its equivalent, the input and output light beams are spatially separated, providing easy access to the input and output light beams without using a beam splitter or the like. A wide range of continuously variable broadening and compression values may be selected because of the continuously adjustable positional translator drive. This apparatus is compact in size and relatively light in weight.

Other possible techniques for altering the spatial/temporal characteristics of a laser pulse generally involve three steps: first, some form of spectral/spatial separation of the pulse; second, selective introduction of optical path length as a function of wavelength; and third, spectral/spatial recombination of the pulse. Diffraction gratings and prisms could be used in the first step, although a grating would be preferred due to the high, angular dispersion and linearity of the dispersion. Grating pairs, imaging between grating pairs using refractive optics, and double pass optical systems could be used for the second and third steps, but these approaches are not well corrected for monochromatic and polychromatic aberrations. The presence of either kind of aberration is a serious impediment to the orderly creation of a broadened pulse or the creation of a narrowly compressed pulse from a broader pulse. Additionally, alternative techniques fail to provide for spatial separation of the input and output beams for appropriate access to both beams, and do not permit both broadening and compression of the optical pulse with a single apparatus.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 8 is an optical prescription for one form of the mirrors.

DETAILED DESCRIPTION OF THE INVENTION

Figure 1:
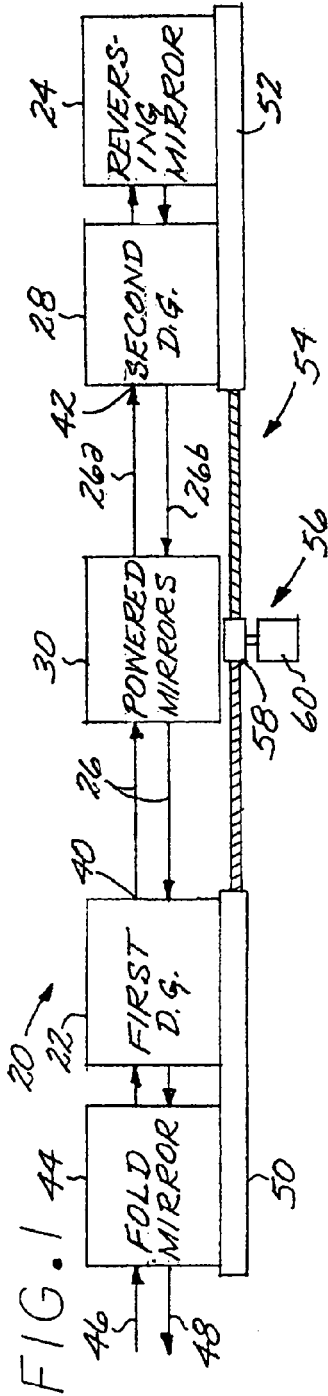
FIG. 1 is a block diagram of an optical pulse-width modifier structure with zero optical path length difference.

FIGS. 1-7 show an optical pulse-width modifier structure 20 in various depictions and configurations. The optical pulse-width modifier structure 20 includes a first diffraction grating 22 ("diffraction grating" is abbreviated as "D.G." in FIGS. 1, 4, and 6) and an optically unpowered reversing mirror 24, which is preferably a roof mirror or an equivalent in which there is a spatial separation of the input and reflected output light beams. (The diffraction gratings could be replaced by prisms, but the use of prisms is not preferred.) An optical path 26 extends between the first diffraction grating 22 and the optically unpowered reversing mirror 24. A second diffraction grating 28 lies on the optical path 26 between the first diffraction grating 22 and the optically unpowered reversing mirror 24. (When an optical component is described herein as lying on the optical path between two other optical elements, the optical component must lie on the optical path at a location along the optical path between the points where the optical path encounters the two other optical elements. The optical component need not, and often does not, lie physically between the two other optical elements.)

A set 30 of four optically powered mirrors lies on the optical path 26 between the first diffraction grating 22 and the second diffraction grating 28. The set of mirrors is shown as a single block in FIGS. 1, 4, and 6, but the individual mirrors are depicted in FIGS. 2, 3, 5, and 7. The set 30 of optically powered mirrors includes four optically powered mirrors: a first optically powered mirror 32 having a positive optical power, a second optically powered mirror 34 having a negative optical power, a third optically powered mirror 36 having a negative optical power, and a fourth optically powered mirror 38 having a positive optical power. Desirably, the first optically powered mirror 32 and the fourth optically powered mirror 38 are identical in surface figure to each other, and the second optically powered mirror 34 and the third optically powered mirror 36 are identical in surface figure to each other.

The set 30 must be made of mirrors. The set 30 may not be made of refractive optical elements such as lenses, because the optical properties of lenses vary according to the wavelength of the light passing through them. The set 30 of optically powered mirrors 32, 34, 36, and 38 is afocal. The set 30 of optically powered mirrors 32, 34, 36, and 38 has a first pupil 40 at the first diffraction grating 22 and a second pupil 42 at the second diffraction grating 28.

The optical pulse-width modifier structure 20 optionally includes an optically unpowered fold mirror 44 positioned to reflect an input light beam 46 to the first diffraction grating 22, and to reflect an output light beam 48 from the first diffraction grating 22.

The diffraction gratings 22 and 28, and mirrors 24, 32, 34, 36, 38 and 44 (where used) are positioned such that the input light beam 46 is reflected from the optically unpowered fold mirror 44 (where used), diffracted from the first diffraction grating 22, reflected from each of the set 30 of optically powered mirrors 32, 34, 36, and 38 in that order, and diffracted from the second diffraction grating 28. The optical path 26 is then reflected from the optically unpowered reversing mirror 24 back through this same set of optical components in the opposite order. That is, the optical path 26 travels from the optically unpowered reversing mirror 24 back to the second diffraction grating 28, diffracted from the second diffraction grating 28, reflected from each of the set 30 of optically powered mirrors 38, 36, 34, and 32 in that order, diffracted from the first diffraction grating 22, and reflected from the optically unpowered fold mirror 44 (where used) as the output light beam 48.

The optically unpowered mirror 24 is termed a "reversing" mirror because it reverses the direction of the optical path 26 back through the other elements of the optical pulse-width modifier structure 20. Where the optically unpowered reversing mirror 24 is a flat mirror, the outgoing optical path 26b is coincident with the incoming optical path 26a. The result is that the output light beam 48 is coincident with the input light beam 46. In a more preferred embodiment, the optically unpowered mirror 24 is a roof mirror or its equivalent that transversely displaces the outgoing optical path 26b from the incoming optical path 26a. The result is that the output light beam 48 is transversely spatially separated and displaced from the input light beam 46, as may be seen in the perspective view of FIG. 3. This spatial separation is a convenience because it allows the output light beam 48 to be routed for further use without the need for a beam separator such as a partially reflecting mirror.

The degree of temporal pulse broadening (i.e., expansion) or compression of a laser or other light pulse is determined by the distance, measured along the optical path 26, between the first diffraction grating 22 and the second diffraction grating 28. For some applications, this distance may be fixed. More generally and preferably, however, the distance between the diffraction gratings 22 and 28 is adjustable. To allow this distance to be controllably adjusted, the optical pulse-width modifier structure 20 is preferably provided with a positional translator having a first support 50 upon which the first diffraction grating 22 and the optically unpowered fold mirror 44 (where used) are mounted, and a second support 52 upon which the second diffraction grating 28 and the optically unpowered reversing mirror 24 are mounted.

Figure 4:
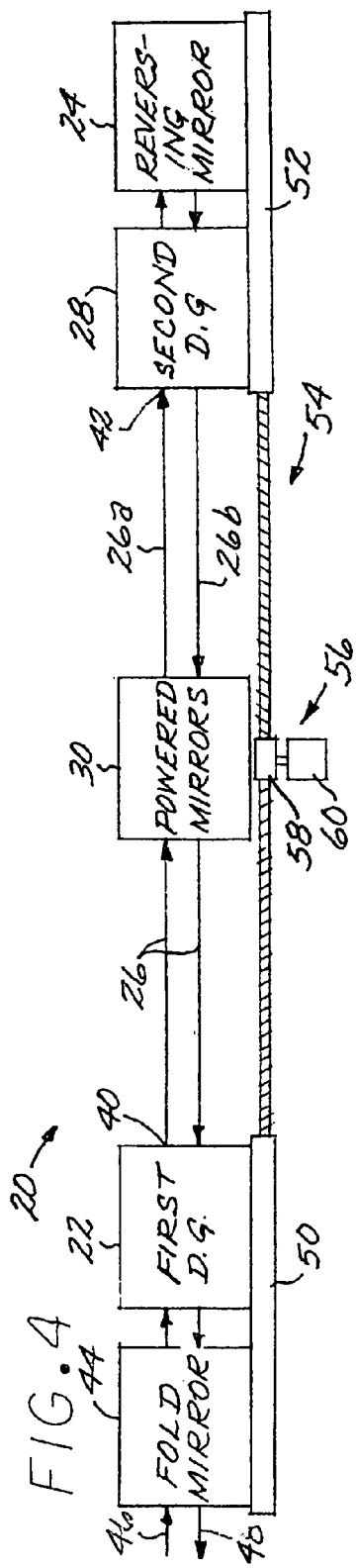
FIG. 4 is a block diagram of an optical pulse-width modifier structure with a positive optical path length difference in the longer wavelength.
Figure 5:
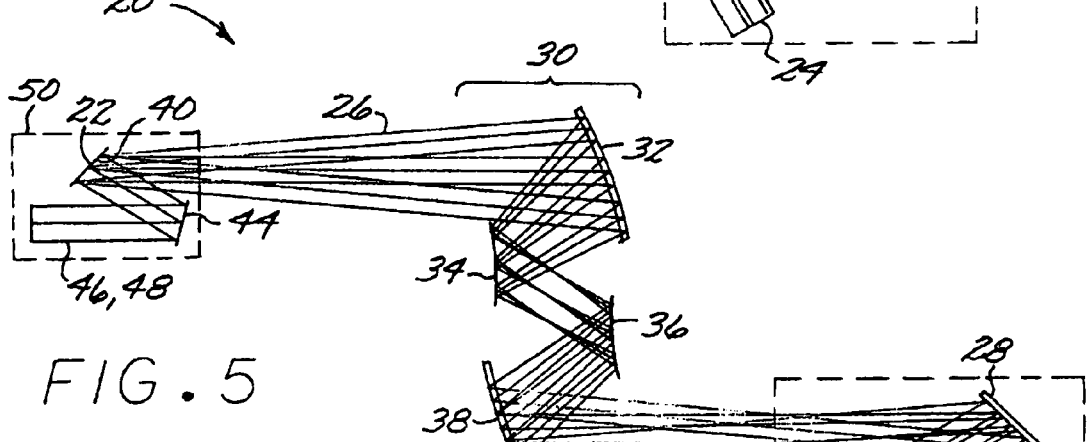
FIG. 5 is a schematic plan-view ray-path drawing of the optical pulse-width modifier structure with a positive optical path length difference in the longer wavelength.

The positional translator drive 54 moves the first support 50 and the second support 52 toward or away from the set 30 of optically powered mirrors 32, 34, 36, and 38 in a coordinated, symmetric fashion. That is, the translator drive 54 includes a support drive 56 that moves the first support 50 to the left by the same amount that it moves the second support 52 to the right, to maintain the symmetry of the structure about the set 30 of optically powered mirrors. This maintenance of symmetry is illustrated in FIGS. 4-5 as respectively compared with FIGS. 1-2, and in FIGS. 6-7 as respectively compared with FIGS. 1-2 (although the relative changes in path length are greatly exaggerated for illustration). In the illustrated support drive 56, there is a mechanical drive for each of the supports 50 and 52, operating from a gearbox 58 driven by a motor 60. Any other operable type of support drive 56 may be used as well.

Figure 2:
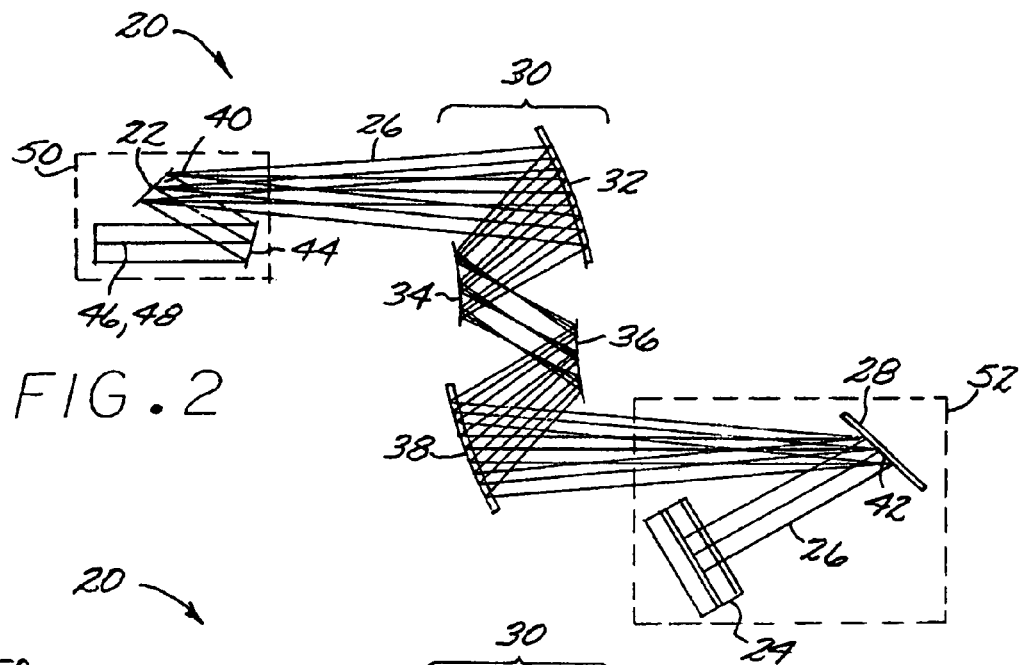
FIG. 2 is a schematic plan-view ray-path drawing of the optical pulse-width modifier structure with zero optical path length difference.

FIGS. 1-2 depict a configuration of the optical pulse-width modifier structure 20 in which there is no optical path length difference (OPL=0) for light of different wavelengths along the optical path 26 between the first diffraction grating 22 and the second diffraction grating 28.

In FIGS. 4-5, the translator drive 54 has been operated to move each of the diffraction gratings 22 and 28 away from the set 30 of powered mirrors by the same amount, relative to their positions in FIGS. 1-2. The result is that there is an optical path length difference for light of different wavelengths. In the configuration of FIGS. 4-5, there is a positive optical path length difference for longer wavelengths (OPL>0 for longer wavelengths). That is, a pulse of light of a range of wavelengths is broadened (expanded) so that the shorter wavelengths are on the leading edge of the pulse, and the longer wavelengths are on the trailing edge of the pulse. In a similar manner, if a previously broadened pulse with long wavelengths leading short wavelengths is passed through the optical pulse-width modifier structure 20 at a later time, there is a temporal compression (narrowing) of the pulse.

Figure 6:
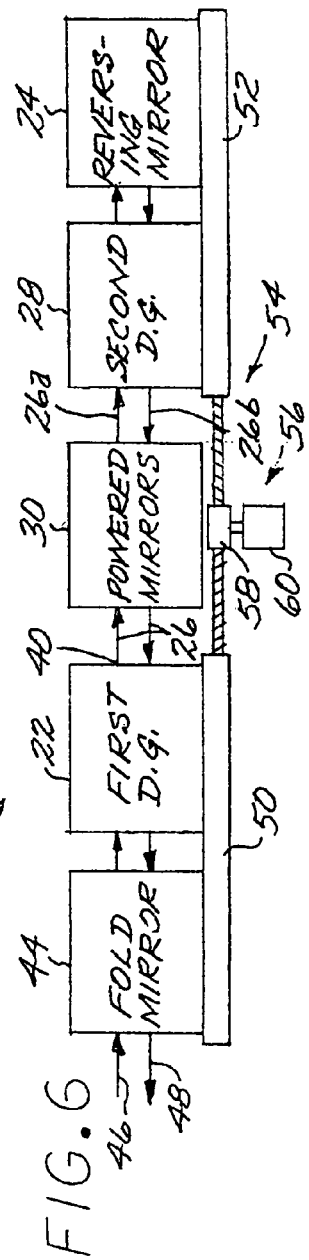
FIG. 6 is a block diagram of an optical pulse-width modifier structure with a positive optical path length difference in the shorter wavelength.
Figure 7:
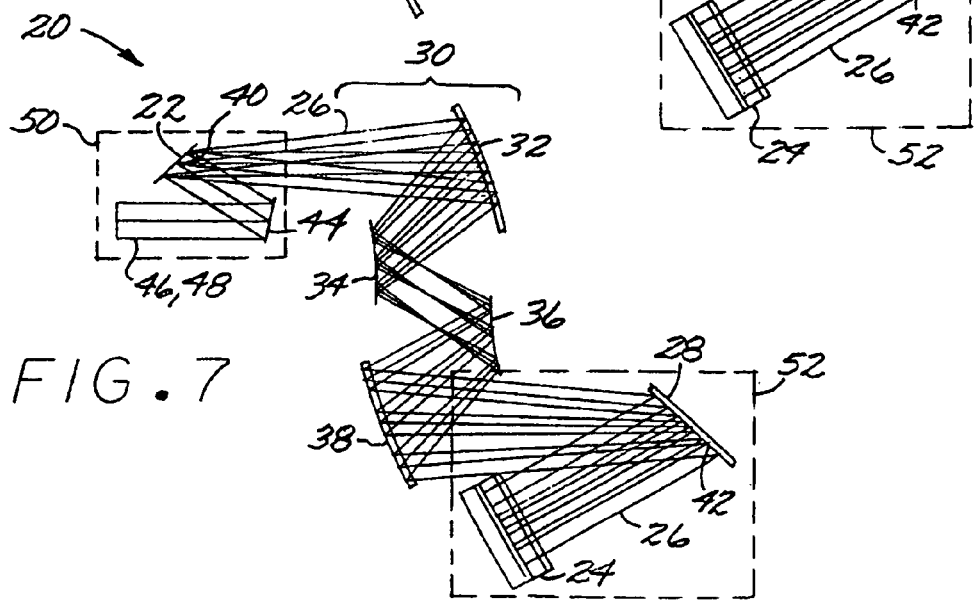
FIG. 7 is a schematic plan-view ray-path drawing of the optical pulse-width modifier structure with a positive optical path length difference in the shorter wavelength.
Figure 3:
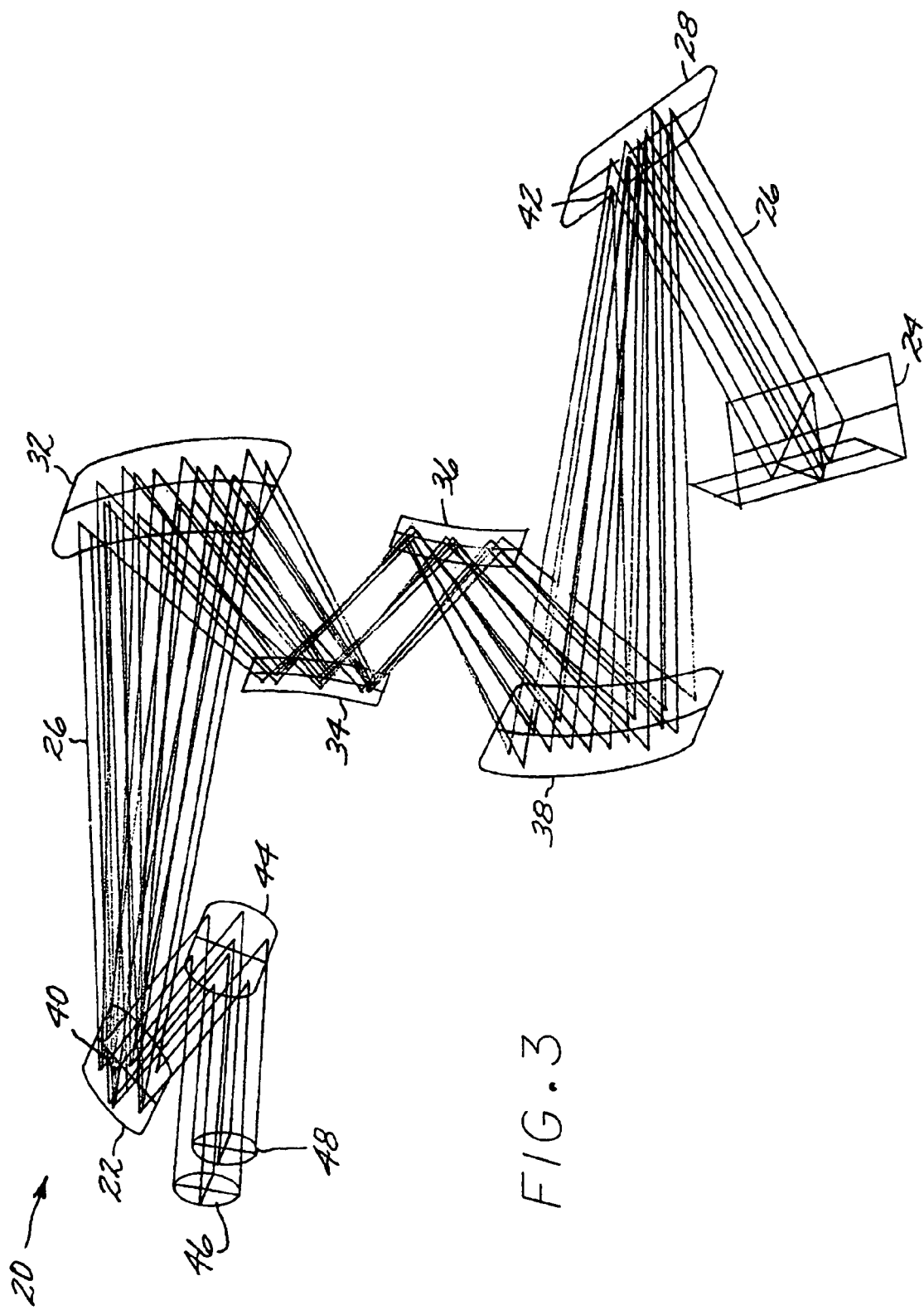
FIG. 3 is a perspective ray-path drawing of the optical pulse-width modifier structure with zero optical path length difference, corresponding to FIGS. 1-2, and omitting the positional translator drive for clarity of illustration.

In FIGS. 6-7, the translator drive 54 has been operated to move each of the diffraction gratings 22 and 28 toward the set 30 of powered mirrors by an equal amount, relative to their positions in FIGS. 1-2. The result is that there is an optical path length difference for light of different wavelengths. In the configuration of FIGS. 6-7, there is a positive optical path length difference for shorter wavelengths (OPL>0 for shorter wavelengths). That is, a pulse of light of a range of wavelengths is temporally broadened (expanded) so that the longer wavelengths are on the leading edge of the pulse, and the shorter wavelengths are on the trailing edge of the pulse. In a similar manner, if a previously broadened pulse with short wavelengths leading long wavelengths is passed through the optical pulse-width modifier structure 20 at a later time, there is a temporal compression (narrowing) of the pulse.

An optical pulse-width modifier structure 20 has been designed according to the preferred structure illustrated in FIGS. 1-7 and described above. FIG. 8 sets forth an optical prescription for an operable set 30 of the four optically powered mirrors 32, 34, 36, and 38.

In considering temporal pulse broadening and compression of a laser pulse, it must be kept in mind that laser light, while usually thought of as pure monochromatic light on a gross scale, actually exhibits a small wavelength spread about its nominal monochromatic wavelength value. All of the components of the wavelength spread carry energy. This small wavelength spread is the basis for the pulse expansion and compression of the present approach. Based upon this small wavelength spread, the present approach allows temporal broadening and temporal compression of the laser pulse by factors of several thousand. For example, a temporal broadening of a laser pulse from 50 femtoseconds to 200 picoseconds is an expansion by a factor of 4000.

The structure described herein is capable of spatial and temporal compression of a long optical pulse, as well as the spatial and temporal broadening of a short optical pulse by the selective introduction of optical path length as a function of wavelength. Very large expansion and compression ratios are possible because of the absence of both monochromatic and polychromatic aberrations. Additionally, the structure provides for spatial separation of, and therefore easy access to, the input and output beams.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical pulse-width modifier structure, comprising:
 a first diffraction grating;
 an optically unpowered reversing mirror, wherein an optical path extends between the first diffraction grating and the optically unpowered reversing mirror;
 a second diffraction grating lying on the optical path between the first diffraction grating and the optically unpowered reversing mirror; and
 a set of optical powered mirrors lying on the optical path between the first diffraction grating and the second diffraction grating,
 wherein the diffraction gratings and mirrors are positioned such that an input light beam in order is diffracted from the first diffraction grating, reflected from each of the set of optically powered mirrors, diffracted from the second diffraction grating, reflected from the optically unpowered reversing mirror back to the second diffraction grating, diffracted from the second diffraction grating, reflected from each of the set of optically powered mirrors, and diffracted from the first diffraction grating as an output light beam.

2. The optical pulse-width modifier structure of claim 1, wherein the set of optically powered mirrors has a first pupil at the first diffraction grating and a second pupil at the second diffraction grating.

3. The optical pulse-width modifier structure of claim 1, wherein the set of optically powered mirrors comprises four optically powered mirrors.

4. The optical pulse-width modifier structure of claim 1, wherein the set of optically powered mirrors comprises four optically powered mirrors having optical powers in order of positive, negative, negative, and positive.

5. The optical pulse-width modifier structure of claim 1, wherein the optically unpowered reversing mirror is a roof mirror.

6. The optical pulse-width modifier structure of claim 1, wherein the input light beam is spatially separated from the output light beam.

7. The optical pulse-width modifier structure of claim 1, wherein the optically unpowered reversing mirror spatially separates the input light beam from the output light beam.

8. The optical pulse-width modifier structure of claim 1, further including
an optically unpowered fold mirror positioned to reflect the input light beam to the first diffraction grating.

9. The optical pulse-width modifier structure of claim 1, further including
a positional translator having
a first support upon which the first diffraction grating is mounted,
a second support upon which the second diffraction grating and the optically unpowered reversing mirror are mounted, and
a translator drive that moves the first support and the second support toward or away from the set of optically powered mirrors in a coordinated fashion.

10. The optical pulse-width modifier structure of claim 9, wherein there is no optical path length difference for light of different wavelengths along the optical path between the first diffraction grating and the second diffraction grating.

11. The optical pulse-width modifier structure of claim 9, wherein there is an optical path length difference for light of different wavelengths along the optical path between the first diffraction grating and the second diffraction grating.

12. The optical pulse-width modifier structure of claim 1, wherein the set of optically powered mirrors comprises four optically powered mirrors having optical powers in order of positive, negative, negative, and positive.

13. The optical pulse-width modifier structure of claim 1, further including
an optically unpowered fold mirror positioned to reflect the input light beam to the first diffraction grating.

14. The optical pulse-width modifier structure of claim 1, further including
a positional translator having
a first support upon which the first diffraction grating is mounted,
a second support upon which the second diffraction grating and the optically unpowered reversing roof mirror are mounted, and
a translator drive that moves the first support and the second support toward or away from the set of optically powered mirrors in a coordinated fashion.

15. The optical pulse-width modifier structure of claim 14, wherein there is no optical path length difference for light of different wavelengths along the optical path between the first diffraction grating and the second diffraction grating.

16. The optical pulse-width modifier structure of claim 14, wherein there is an optical path length difference for light of different wavelengths along the optical path between the first diffraction grating and the second diffraction grating.

17. An optical pulse-width modifier structure, comprising:
a first diffraction grating;
an optically unpowered reversing mirror, wherein an optical path extends between the first diffraction grating and the optically unpowered reversing roof mirror;
a second diffraction grating lying on the optical path between the first diffraction grating and the optically unpowered reversing roof mirror; and
a set of four optical powered mirrors lying on the optical path between the first diffraction grating and the second diffraction grating, wherein the set of optically powered mirrors has a first pupil at the first diffraction grating and a second pupil at the second diffraction grating, and
wherein the diffraction gratings and mirrors are positioned such that an input light beam in order is diffracted from the first diffraction grating, reflected from each of the set of optically powered mirrors, diffracted from the second diffraction grating, reflected from the optically unpowered reversing roof mirror back to the second diffraction grating, diffracted from the second diffraction grating, reflected from each of the set of optically powered mirrors, and diffracted from the first diffraction grating as an output light beam, and wherein the input light beam is spatially separated from the output light beam.

* * * * *